3,118,197
METHOD AND APPARATUS FOR MAKING A FLEXIBLE CASTING
James L. Yates, Elgin, Ill., assignor to Crane Co., Chicago, Ill., a corporation of Illinois
Filed Mar. 16, 1961, Ser. No. 96,141
2 Claims. (Cl. 22—200)

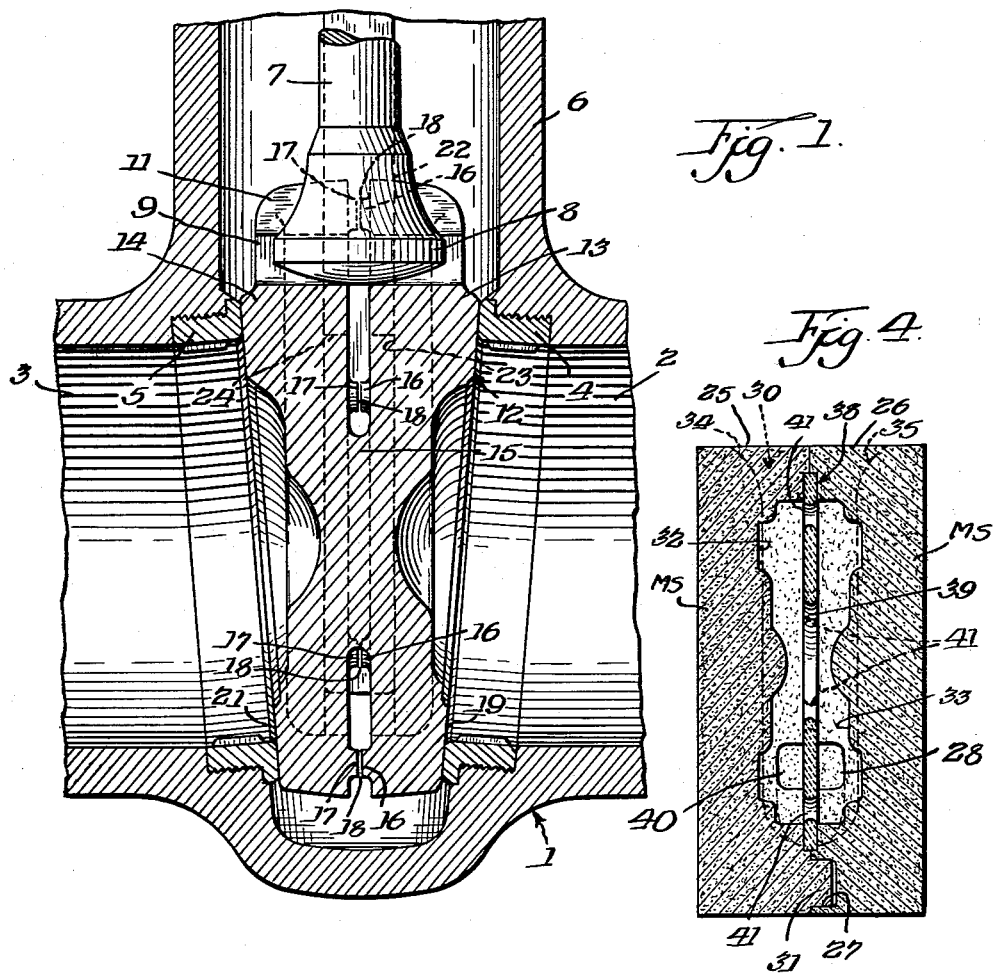

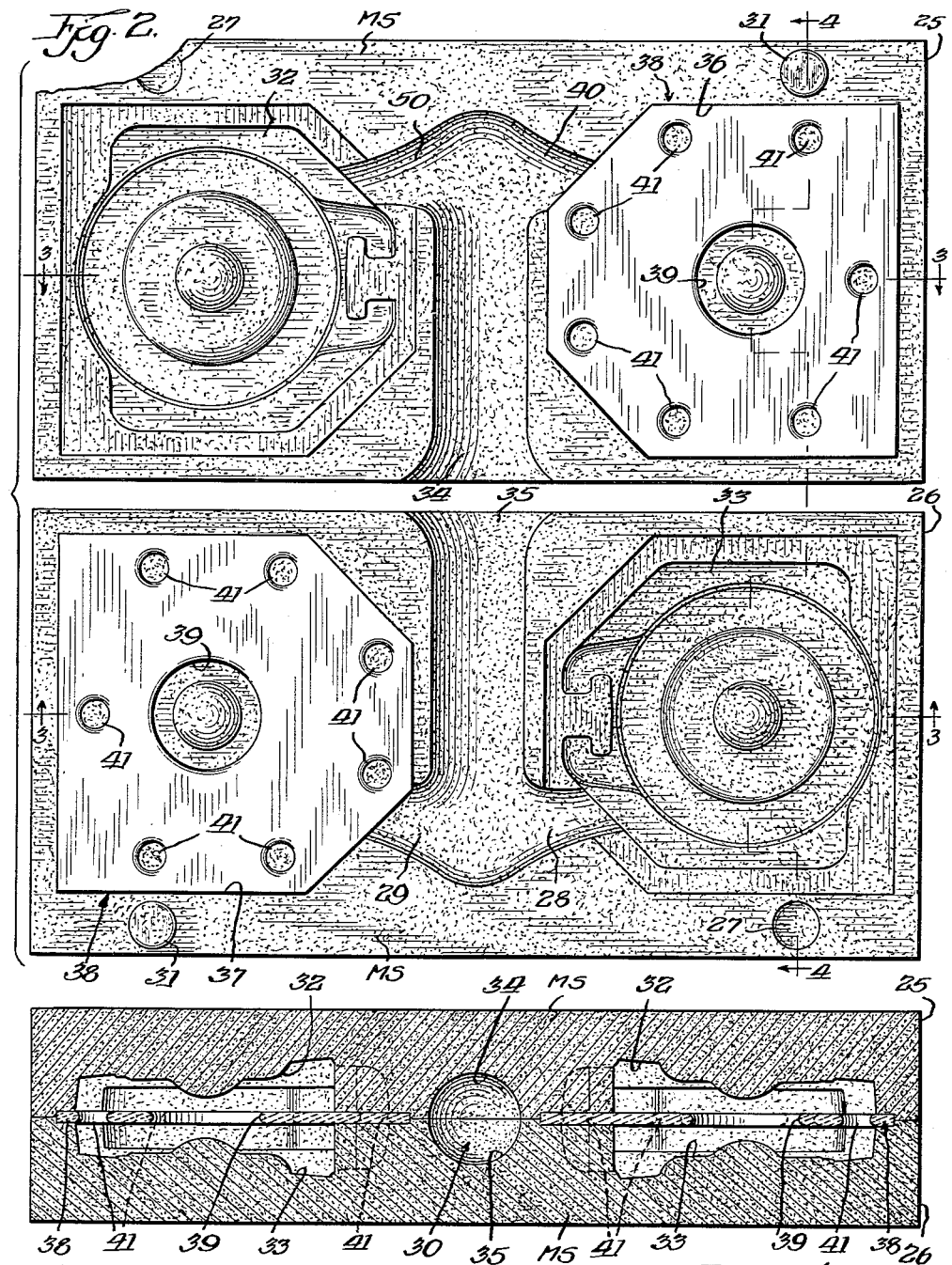

This invention relates generally to the method and apparatus for the production of certain types of flexible metal castings in which such castings, by virtue of their particular configuration, possess flexibility and accommodate themselves to rapid and sudden changes in temperatures. More specifically, the invention is concerned with a method and apparatus for making such types of flexible castings, as, for example, gate valve closure members, in which the flexibility imparted by the form of casting enables it to seal upon suitable shaping and machining with other adjacent metals and maintain a fluid tight joint despite distortion taking place in the valve body encountered in service.

Such flexible casting has an application among other uses as a reciprocally movable flexible disc gate, plug, or rotary valve useful in the control of fluids, gases, or semi-liquids through such various types of valves. It may also have application in fields other than valves where casting flexibility is wanted.

In order to obtain a better appreciation of the importance of this contribution, it should be understood at the outset that many sealing devices or closures have been used in the past in an effort to provide a sealing medium between the inlet and outlet portions of a gate valve, for example. However, in nearly all cases, these have involved either a multiplicity of closure parts or else have necessitated a number of costly machining operations, or both. The type of valve to which this invention is adapted is, perhaps, best illustrated in U.S. Patent No. 2,569,412, granted September 25, 1951, and which is illustrated on page 123 of Crane Co. No. 60 Catalog, identified by the trademark "Flex Gate." In valves of this type, the services for which they are used are frequently relatively severe, both from the standpoint of the line fluid pressures encountered, as well as the relatively high temperatures of the order of several hundred degrees. The movable valve closure member must necessarily be of a form easily adaptable to misalignment occurring in the valve body and seats. At the same time, it must also be flexible in its response when relatively high end thrust loads are applied to the valve closure member in the course of effecting the ultimate seating of the valve in a fluid tight manner. While the patent referred to shows the valve closure member of a two-piece welded construction, it has long been the desire that the same general type of valve closure member should be obtainable by more simple and effective methods of foundry production.

Accordingly, this invention relates particularly to the method and apparatus for producing this type of closure member as a one-piece cast flexible disc gate or plug of various and sundry metals, compositions, or even non-metallic combinations depending upon ultimate service for which the valve is intended.

Heretofore, flexible discs, gates, or plugs of this general type have been machined in many instances from solid castings or else tie-welded in order to provide the desired flexibility in the disc, gate or plug in the original casting. It should be understood that in order for the latter members to function properly, each of the adjacent connected portions carrying the seating faces thereof must be so arranged that each portion can move independently of the other without reducing its ability to maintain a fluid tight joint or seal against the seating surface with which it makes contact, regardless of the fact that such severe temperatures, pressures, and temperature changes as above referred to may be encountered. For example, in a refinery fire and in the subsequent attempts to control the fluid pipe lines there frequently results extensive and violent changes in temperature within the valve assembly as a whole. There are also such cases where the valve constitutes the barrier or control between hot gases, liquids, or semi-solids on one side of the valve as contrasted with similar materials at decidedly lower temperatures and/or pressures on the opposite side of the valve.

In the development leading to the discovery of this method and apparatus, certain factors were found. In order to provide the desired flexibility, a solid hub at substantially a central portion thereof has been provided between the seating halves of the closure member, resulting in two independently flexible halves radiating therefrom as a circular cantilever beam.

It was discovered that conventional methods of molding tend to generate considerable gas within the molding material during the metal pouring cycle and to provide for the escape of gases both through the cores and through the molds previously used. In the latter connection, it should be realized that normal core making materials tend either to generate gases within themselves or to transmit gases generated by the incoming metal, the expanding gases due to relatively serious temperature changes and also by gases generated by the various metals themselves. It should further be understood that by such phenomenon, occurring gases are forced into the metal of the resulting castings, and thus tend to cause objectionable microscopic porosity.

Accordingly, it is one of the more important objects of this invention to substitute for the usual core a novel material in a form which is more accurately described as a dam or wafer having the necessary strength in its cold or green condition to be handled in a thin layer. Further, it has high resistance to thermal shock as used in the mold, sufficient friability to be removed readily from the casting after the latter has been poured and has solidified. Further, the nature of the material is such that it will prevent the flow of mold gases and metal gases from one mold cavity to the other.

Therefore, it is another important object to provide a suitably ported material, the said material being fired in such manner as to produce a dense non-gassing medium, and further, one which is impervious to the passage of such gases during the foundry operation.

It is a still further important object of this invention to provide in a preferably plate-like configuration a wafer dam member having unusual heat resisting properties, in addition to possessing those physical characteristics above referred to.

In meeting these requirements, a combination of elements has been discovered as possessing such properties containing elements as pyrophyllite, kynanite, mullite, and other clays in combination, the said mixture of a refractory nature being formed and fired at a very high temperature. Such forming and processing, preferably, but not necessarily, may be under pressure.

Another object is to provide for a method and means for supporting the wafer dam in the mold so that when pouring the metal, the wafer dam extends in a substantially vertical plane, although the position in the mold of the gates, the risers, or the sprues may vary in their respective location, form, or size. Experience has indicated that in many cases with the wafer dam in the horizontal position, there was a tendency for the metal to trap the gases generated during the pouring cycle.

In light of the foregoing and while in the large majority of conventional molding machines the methods employed in the manufacture of such castings usually employ molds split along a horizontal center line, means were developed in the instant invention for making the molds and setting the wafer dams initially in a horizontal position and then so gating them that they later can be rotated 90° and the molten metal poured vertically.

It was also established that molds of this type could be made horizontally, stacked horizontally, and then rotated 90° through a specially designed handling device enabling the pouring of the metal successfully with the molds in the vertical position.

In connection with the establishment of a proper molding medium for making the molds in the cope and drag, it has been found that such molds made from sand with a sodium silicate, with adequate binder, such as sugar binder, hardened by permeation with carbon dioxide gas are satisfactory. A mold made with a face of refractory surface for exposure directly to hot molten metal and with a backing of ordinary molding materials also worked successfully.

As will be appreciated in connection with the demands made upon flow control devices, such as gate valves, among others, special arrangements require protecting the seating faces against erosion or corrosion, or both, encountered in their many diversified field uses. In such cases, hard facing materials are frequently employed for the valve closure members, the application of which facing resists exposing the said closure member during such process to extremely high temperatures.

Accordingly, a further object is to provide a closure member which by the method and apparatus used permits such high temperature exposure without danger of distortion due to the novel construction employed. In connection with such metal facing applied to the valve closure member seating contact surfaces, it will be appreciated that there is considerable difference frequently in the coefficients of expansion between the two metals which are being combined with resultant strains being set up in one or both of the materials in the end product. Observation indicates that these strains manifest themselves in many ways. The principal one of which is distortion, which with certain combinations may be such as to preclude the accurate machining necessary to provide a properly functioning movable valve closure member.

It is therefore a further object of the invention to provide a dam member in combination with the method and apparatus employed in which by porting or providing through holes therefor the said dam member at predetermined optimum locations the resultant casting is such as will overcome the objections immediately above referred to and will permit the overlaying or depositing of hard facing materials by fusion, welding, or other means, without the occurrence of objectionable distortion of the closure member. Such internal stresses as may thereafter exist can subsequently be removed by suitable heat treatment if deemed desirable.

It will be appreciated that after the processing of the valve closure member is completed, such as heat treatment and facing then with a suitable cutter the ties formed by the metal poured through the ports can easily be severed, slit or cut through to provide the desired flexibility between the disc or closure halves and thereby provide controlled flexibility thereof very accurately as will hereinafter become apparent.

Other objects and advantages will become more readily appreciated upon proceeding with the following description read in light of the accompanying drawings, in which:

FIG. 1 is a fragmentary sectional assembly view showing one form of a movable valve closure assembly embodying my invention;

FIG. 2 is a plan or open face view of cope and drag molded portions in a foundry flask in side by side relation embodying the apparatus of the invention;

FIG. 3 is a view taken on the line 3—3 of FIG. 2, but with the cope and drag in the flask closed position ready for pouring;

FIG. 4 is a transverse sectional view taken on the line 4—4 of FIG. 2 and in the flask closed position as referred to in connection with FIG. 3; and FIG. 5 is a perspective exterior view of one embodiment of the water dam member embodying my invention.

Similar reference numerals refer to similar parts throughout the several views.

Referring now generally to FIG. 1, a conventional gate valve body or casing 1 is shown in fragmentary section, having the usual fluid inlet 2 and outlet 3, which positions may of course be reversed. The respective inlet and outlet ports at their inner ends are provided with the valve seats 4 and 5, which, as illustrated, are separate members, but may be integral with the casing 1. At the upper portion of the body at 6, the usual body extension is provided for attachment of a valve bonnet and journaling means for an actuating mechanism (not shown). The extension also serves as the means by which the valve stem 7 and the T-head 8 are received and engage a similarly formed T-head recess 9 on the valve closure member, having the overlapping and inwardly extending flange 11. In this particular embodiment, the gate valve closure member which is generally designated 12 is reciprocally movable with relation to the valve seats 4 and 5 and is made with two half portions 13 and 14. The latter portions which perform the valve seating function as shown are joined at a central tie or connection 15 and preferably rounded or filleted as shown to avoid concentrated corner stresses if made with a sharp annular corner at the connection with the said half portions. In addition, the annularly disposed spaced apart lugs as at 16 and 17 are also provided for reasons hereinafter made clear and are also annularly rounded at their point of attachment with the said closure half portions 13 and 14 as illustrated and for the same reason as mentioned above. The said lugs originally cast integrally have between them a space 18, when ready for assembly in the valve body, the purpose of which also will be described later. Thus, the seating contacts with the annular valve in the closed position are made at 19 and 21 respectively with the body seats 4 and 5. The space 18 in its height may vary from a mere slit to one of more substantial proportions as illustrated, depending upon the service and the degree of flexibility desired in the closure member without exceeding the modulus of elasticity of the material.

For purpose of guiding the valve closure member 12 in its movement reciprocally within the valve body, a body rib 22 may be used which extends preferably for substantially the length of the travel of the movable valve closure member within the valve body and slidably engages the grooved surface 23 to effect such guiding, the body rib 22 preferably terminating at 24.

The purpose of the foregoing description is only to provide an introduction as to one type of flexible casting for which the method and apparatus of this invention has been found to be unusually satisfactory. It is the method of manufacture of the closure member 12 for example with which this invention is primarily concerned. Therefore, attention is now directed to the remaining figures comprising the drawings which describe one preferred form of the method and apparatus to accomplish the end result and attendant advantages hereinabove set forth.

Referring now to FIG. 2, a conventional foundry flask is shown consisting of the usual two halves comprising the cope 25 and the drag 26 and are in the usual frame form when viewed in open face or plan view. For purpose of their assembly and alignment in the usual superposed position, the usual flask pins at 27 and 31 are provided, engaging the respective recesses therefor, the mold being gated as shown more clearly in the drag portion of said mold as shown in FIG. 2 at 29 and 31.

Let it be assumed that the foundry molding sand generally designated MS has already been molded by means of a valve closure member pattern (not shown) to form the general outline in relief of a valve closure member such as the member 12, which relief portion is designated 32. It will, of course, be understood that the pattern member on its longitudinal section is divided so that the counterpart of the relief portion 32 is formed at 33 in the drag 26. The respective cope and drag in this case are provided with the sprue halves 34 and 35 ultimately forming when assembled, as shown in FIG. 4, the sprue 30. Thus, from the flask arrangement indicated, it will be clear that two complete movable closure members 12 can be cast simultaneously. In that portion of the cope 25 as designated at 36 and in the drag as designated at 37 by prior molding, a print has been made to receive the wafer dam members 38, each of which is identical, because each of the gate patterns are the same in this application. It will be understood that each of these plate-like wafer dam members is of the general form and thickness shown more clearly in the exterior perspective view of FIG. 5. From inspection of this figure and comparing it with the valve closure member shown in FIG. 1, it should now be understood by its control over the molten metal passing therethrough that the aperture 39 also governs dimension for size and the positioning of the integral tie 15 of the closure member. Similarly, the annularly disposed and spaced apart apertures 41 determine the location and size of the annularly arranged ties 16 and 17 positioned around the central tie 15. It will, of course, be appreciated that in the positioning of the wafer dam 38 within the mold, these ties are thus cast integral. The space 18 shown in FIG. 1 is subsequently made by, say, a saw blade cutting completely through at a predetermined time as further explained. The latter severance operation is preferably done after the valve closure member has been machined as desired and heat treated. The size, number, and arrangement of the ties 16, 17 may vary and some may be slit or cut, and others may not, depending on the nature of the service condition.

In the actual pouring of the molten metal, the respective cope and drag halves 25 and 26 of the flask are moved and placed together so as to be poured to form a plurality of openings generally designated 41, as shown more clearly in FIG. 3. This is accomplished by the gate half portions 34 and 35 and then pouring from the top opening 30 while the flask is turned 90° to the vertical position illustrated, at which the flask pins 27 and 31 engage the recesses 27 and 31. It will be noted that by such flask positioning, the oppositely disposed relieved portions 36 in the molds of the cope and the drag will hold the wafer dam member 38 firmly in position. Thus the wafer dam spans the recess portions 32 and 33 of the respective halves to form the complete closure member casting when assembled as indicated in FIGS. 3 and 4.

As will, perhaps, be more graphically shown in FIG. 3, the gate halves are supplied with molten metal by gates 40 and 50 in the cope 25 directly communicating with sprue 30 and drag gates 28 and 29 and are so arranged that the dam 38 functions as a ported obstruction, whereby the only passage for flow of the molten metal as it enters the molded recesses 32 is effected by its flow through the central aperture 39 of the wafer dam and through the annularly located smaller ports 41, thereby forming the larger integral center portion 15 and also the smaller ties 16 and 17. It should be understood that in the absence of the cutting through at 18, the latter ties extend integrally across between the closure halves 13 and 14 in the same manner as described in connection with the enlarged central connection or tie at 15.

It should also be noted that when viewed transversely or in plan the location of the lugs formed by the passage of the molten metal through the apertures 41 is preferably relatively close as possible to the outer periphery of the closure member, the purpose being to distribute such support during the course of handling the cast closure member while handling the heat treatment and the subsequent machining thereof. Thus, these connecting ties formed through apertures 41 serve as the means for effectively supporting the closure member 12 during such machining operations and also providing the assurance of improved accuracy in the machining of such contact faces as at 19 and 21 or in applying special seat facings thereto (not shown) when the latter deposit operation becomes necessary with its involvement of relatively high temperatures.

It will, of course, be understood that in connection with assuring the desired space 18 to minimize the amount of flexibility permissible in the closure member 12 that interposed shims (not shown) applied at 18 may be used to provide such high degree of accuracy and thus avoid the objection of possibly exceeding the metal fatigue limit or modulus of elasticity under high loads, say, seating, for example, in service. Further, the specific location and number of the lugs 16 and 17 can be adjusted, depending upon the nature of the foundry problems encountered in making the casting and/or the subsequent machining or heat treatment required, considering the facing problem and also the particular type of casting under consideration, whether it is a rotary plug, or ball valve, or even other kinds of castings, not necessarily for use in a valve but where flexibility is desired.

It will, accordingly, be appreciated that by an actual casting being made to provide the flexibility between the half portions the prior expensive machining of a solid casting has been avoided. Also the provision for the distribution of the integral lugs formed at 41 and extending annularly inward of the periphery of the closure member permits of the latter to be handled conveniently in large volume without serious damage either arising from distortion caused, for example, by the deposition of hard facing materials under high temperatures, machining stresses, or generally encountered in the conveyance volume production. There has also been accomplished the elimination of special purposes machine tools. It has been determined that the cost of a finished flexible disc as cast following the method of this invention will be considerbly less than by such machining methods. In this connection, it should be understood that heretofore several cutters have been used in order to form the desired tie, all of which operations have been slow and expensive.

The inert wafer dam employed prevents either the absorption or the passage of mold gases by the wafer dam 38 used in place of the core. Further, the passage of such gases from the mold cavity of the cope or the drag to the other is prevented. Thus, a new foundry application in the combination of materials, apparatus and process has been attained in accomplishing a desirable end result.

While only a single embodiment of the method, apparatus and product of this invention has been shown and described, it will, of course, be appreciated that this is merely for purposes of illustration and the invention therefore should be measured by the scope of the appended claims.

I claim:

1. In the method of making a valve closure member or the like having spaced apart oppositely disposed seating members connected at substantially a central portion thereof, the steps comprising the molding and casting of the closure member, initially molding each of the said seating members in a flask consisting of a cope and drag, forming said connection at said central portion of the closure seating members by interposing between the cope and drag molded portions a flat plate-like perforated nonporous refractory dam, the perforated portion of said dam being arranged on the dam and positioned over the molded portions to form a passage for the molten metal through the dam, assembling the cope and drag, pouring the molten metal to fill the molded portions in the cope and drag and the perforated portion of the plate-like member, allowing the poured metal to solidify, separating the flask cope and drag and removing the refractory dam from between the solidified cast connecting seating members forming the said closure member, the said passage for the molten metal extending through the said dam constituting the ultimate connection between said oppositely disposed seating members of the closure member upon said solidification of the molten metal.

2. In the method of casting a relative flexible gate valve closure member or the like having integrally connected and oppositely disposed seating members, the steps including the molding initially of each of the said seating members in a separable flask comprising a cope and drag, forming an integral connection therebetween by interposing a plate-like ported gas-impervious non-combustible dam between and substantially covering the molded portions of the said cope and drag members, said dam having a large central opening and smaller openings surrounding the central opening, assembling the said cope and drag, pouring the molten metal to fill the molded portions of the cope and drag and the ported portions of said dam to form a large central strut and surrounding smaller struts between said seating members, allowing the poured metal to solidify, disassembling the flask to separate the cope from the drag and removing the said dam from between the seating members forming the said closure member, cutting transversely through at least certain of said smaller struts while leaving the large central strut unsevered whereby to provide flexibility in said valve closure member.

References Cited in the file of this patent

UNITED STATES PATENTS

| | | |
|---|---|---|
| 524,169 | Geyer | Aug. 7, 1894 |
| 1,037,250 | Hinman | Sept. 3, 1912 |
| 1,212,997 | Pate | Jan. 16, 1917 |
| 2,153,035 | Burt | Apr. 4, 1939 |
| 2,486,802 | Selke | Nov. 1, 1949 |
| 2,636,231 | Dougherty | Apr. 28, 1953 |
| 2,656,143 | Fantz | Oct. 20, 1953 |
| 2,797,063 | Hobbs | June 25, 1957 |
| 2,804,667 | Townhill | Sept. 3, 1957 |
| 2,860,392 | McCracker | Nov. 18, 1958 |
| 2,917,798 | Ross | Dec. 22, 1959 |